(No Model.)  2 Sheets—Sheet 1.

A. BOSSARD.
ELECTRIC MOTOR.

No. 349,563.  Patented Sept. 21, 1886.

Witnesses:
J. B. McGirr.
Henry Hasler.

Inventor:
August Bossard
by Connolly Bros
Attys (No Model.) 2 Sheets—Sheet 2.

A. BOSSARD.
ELECTRIC MOTOR.

No. 349,563. Patented Sept. 21, 1886.

Witnesses:
J. B. McGirr.
Henry Hazler.

Inventor
August Bossard
by Connolly Bros
Atty's

UNITED STATES PATENT OFFICE.

AUGUST BOSSARD, OF NEW YORK, N. Y.

ELECTRIC MOTOR.

SPECIFICATION forming part of Letters Patent No. 349,563, dated September 21, 1886.

Application filed May 20, 1886. Serial No. 202,781. (No model.)

*To all whom it may concern:*

Be it known that I, AUGUST BOSSARD, a citizen of the United States, residing at New York, in the county of New York and State of New York, have invented certain new and useful Improvements in Electromotors; and I do hereby declare the following to be a full, clear, and exact description of the invention, reference being had to the accompanying drawings, which form part of this specification.

My invention has relation to electromotors of that class wherein a rotary armature provided with radial wings or spokes of magnetic metal is arranged to revolve within the influence of a series of electro-magnets surrounding the armature-shaft, and in circuit with the sections of a commutator, which directs the energizing-current from one magnet or set of magnets to another successively.

The object of my invention is to provide a novel construction of electromotor, wherein the energy and electro-motive force of the driving-current shall be more fully utilized than heretofore, and which shall be exceptionally powerful, uniform, and reliable.

My invention consists in the novel construction and combination of parts, hereinafter described and specifically claimed.

Figure 1:
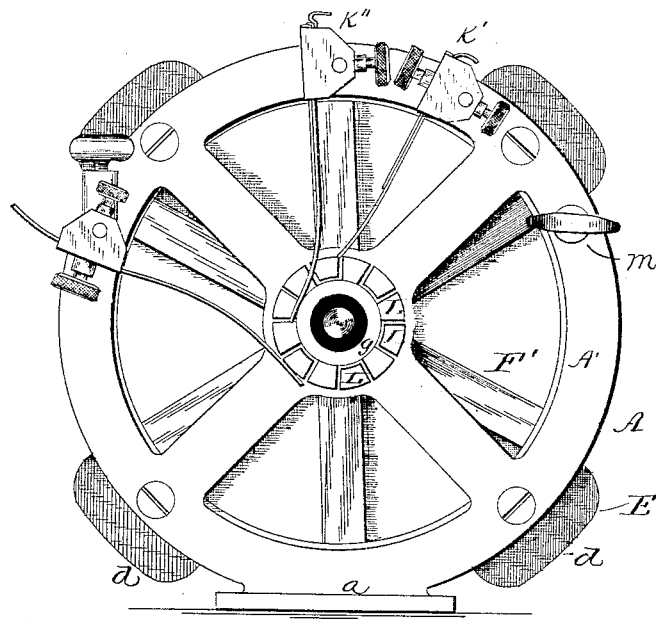
Figure 2:
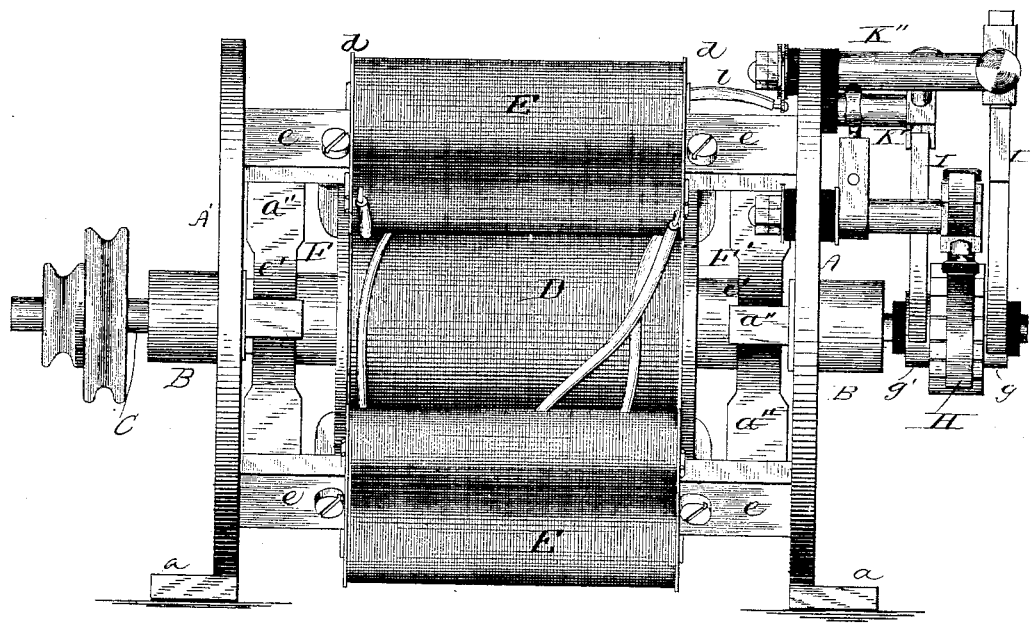
Figure 3:
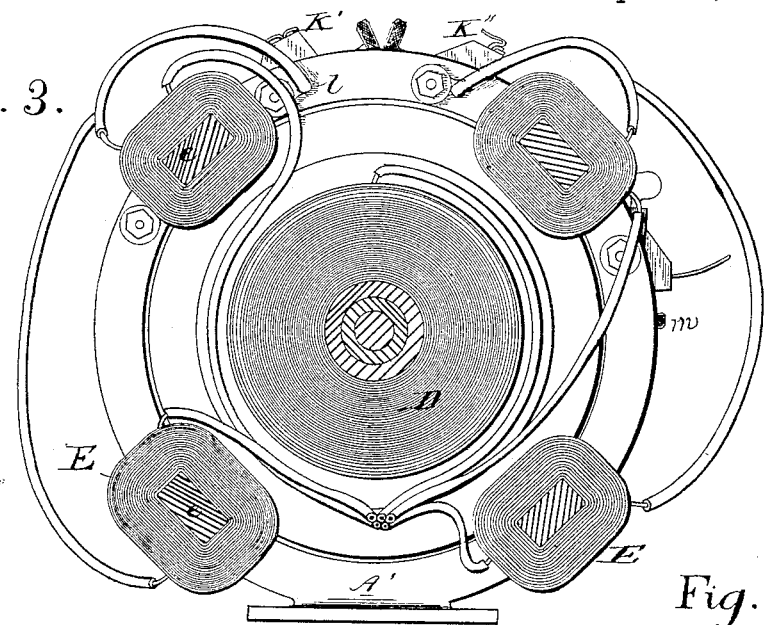
Figure 4:
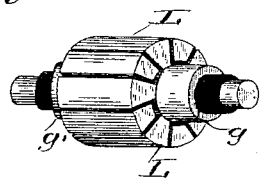
Figure 5:
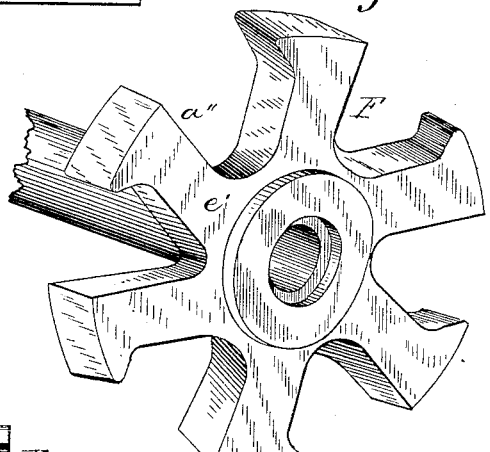
Figure 6:
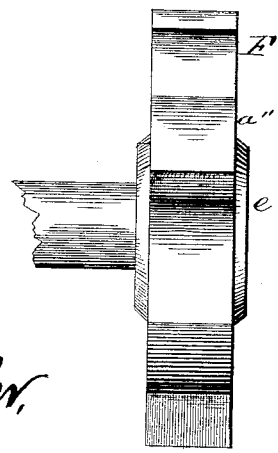

Referring to the accompanying drawings, Figure 1 is an end elevation of an electromotor embodying my invention; Fig. 2, a side elevation of the same; Fig. 3, a vertical transverse section; Fig. 4, a perspective view of the double commutator; Fig. 5, a perspective view of one of the armature-heads, and Fig. 6 a side view of the same.

A designates the frame of the motor, comprising the plates or disks A' A', having feet or base-flanges $a$ $a$ for attachment to a table or other support, and formed with boxes or bearings B B, for the passage of the armature-shaft C. The latter is made of iron or other magnetic metal, and passes through the center of a spool or bobbin, D, wound with insulated wire and mounted between the plates A' A'. The heads of the spool D are secured to and supported by the heads $d$ of the stationary field-magnets E, of which I have shown four, although more may be used, if necessary.

The stationary magnets are arranged at regular intervals between the plates A' A' of the frame and around the outside of the armature-spool D, the rectangular core-bars $e$ of said stationary magnets being elongated and bolted or secured by screws to the plates A' A', as shown.

The armature-shaft is provided with two heads or pole-pieces, F F', at either end of the machine between the adjacent plate A' and the head of the armature-spool. These heads or pole-pieces consist each of a hub, $e'$, and a series of radial arms, $e''$, the latter being of such length as to approach nearly to the cores of the stationary magnets and be forcibly attracted thereby.

For obtaining the best effects from the energizing-current and producing a thorough saturation of the armature-head, the arms $e''$ may be widened at or near their outer extremities, as shown in Fig. 2, or they may be enlarged circumferentially, as shown in Fig. 5.

The commutator is of peculiar construction, and consists of two separate collars, $g$ $g'$, fitted upon the armature-shaft, but insulated therefrom, each collar being formed or provided with a series of segmental sections, L L, so disposed and arranged at regular intervals that when placed upon the shaft the sections of the one will interlock and alternate with those of the other without coming in contact. As will be understood, the two members of the commutator are insulated from one another.

An adjustable brush, H, is mounted upon a bracket secured to one of the plates A' and insulated therefrom. This brush has connection with one of the battery-wires, and makes circuit with but one section at a time of the commutator. The circuit through the machine from the commutator is by two paths—i. e., from each member of the commutator—and for this purpose the two collecting-brushes I I' are provided, each being adjustably attached to a rod or support, K' K'', respectively mounted on the frame of the machine.

From the brush-support K' a wire, $l$, leads inwardly and is branched, so as to lead to one upper and one lower field-magnet, while from the brush-support K'' a similar wire leads off and is branched and led by separate branches to one upper and one lower field-magnet. From the field-magnets wires are led off and connected altogether and to a wire in circuit with the spool surrounding the armature core or shaft, which is in circuit with the frame of the machine, to which is secured a binding-post, m, connected with the other wire of the battery. This completes the circuit through the machine.

I have shown the commutator as composed of twelve sections; hence in one revolution of the armature there are twelve changes or diversions of the current between the field-magnets, the pairs, consisting of one upper and one lower magnet, being energized alternately.

The winding of the different magnets is such that the armature-heads or pole-pieces will be of contrary polarity to the ends of the field-magnets near which they revolve, while the armature-spool is wound so that with a given current the magnetic energy of the armature will be as nearly equal to that of the field-magnets when the latter are changed as it is possible to provide.

By surrounding the armature shaft with a coil I obtain very powerful effects, manifestly exceeding such as would be obtained were the field-magnets alone energized, as by directly inducing magnetism in the armature the latter and the field-magnets form together a closed magnet or magnetic field.

While I have shown and described but four field-magnets, I may use a greater number, coupling them together in sets of three or more.

The armature spokes or arms are greater in number than the field-magnets, so as to bring the armature at all times within a magnetic or attractive field, and to further increase the efficiency of the machine in this respect the two armature-heads are so disposed on the shaft that the arms or spokes will be out of line; hence there will always be one or more of the armature-wings within the attraction of the field.

The construction shown in Fig. 5 is adopted in some cases and is advantageous, as the circumferential enlargement of the ends of the spokes of the pole-pieces prevents them from ever getting without the pull of the field-magnets.

The commutator, as will be seen, is of very simple construction, while it is especially adapted for conducting the currents of electricity in the paths of greatest efficiency. The commutator consists of but two parts or castings, which do not require the attachment of wires, but make circuit with the magnets through brushes in contact with their collars. The commutator may be divided into as many commutating-sections as desired, so as to effect a greater or less number of changes in one revolution.

Having described my invention, I claim—

1. In an electric motor, the combination of a rotary armature-shaft having pole-pieces with radial arms, a bobbin or coil of wire surrounding said shaft, a series of stationary field-magnets having cores, which form, with the armature, a closed magnetic field, and which are wound and connected in pairs by branch connections, and all connected with the armature-bobbin and a commutator, and suitable connections whereby the energizing-current is alternately directed through the different couples or pairs of field-magnets and constantly conducted in one direction through the armature-bobbin, as set forth.

2. In an electric motor, the combination, with a rotary armature-shaft having pole-pieces with radial arms, of a series of field-magnets whose coils are connected together in pairs or series, and having cores which, with the armature pole-pieces, form a closed magnetic field, said field-coils being all connected to and in common circuit with the armature-bobbins and in alternating circuit with the commutator, substantially as described.

In testimony that I claim the foregoing I have hereunto set my hand this 14th day of May, 1886.

AUGUST BOSSARD.

Witnesses:
HENRY HASLER,
PAUL F. CAERRY.